June 17, 1958 L. M. KURTZ 2,839,241
SEALING DEVICE
Filed Jan. 16, 1945
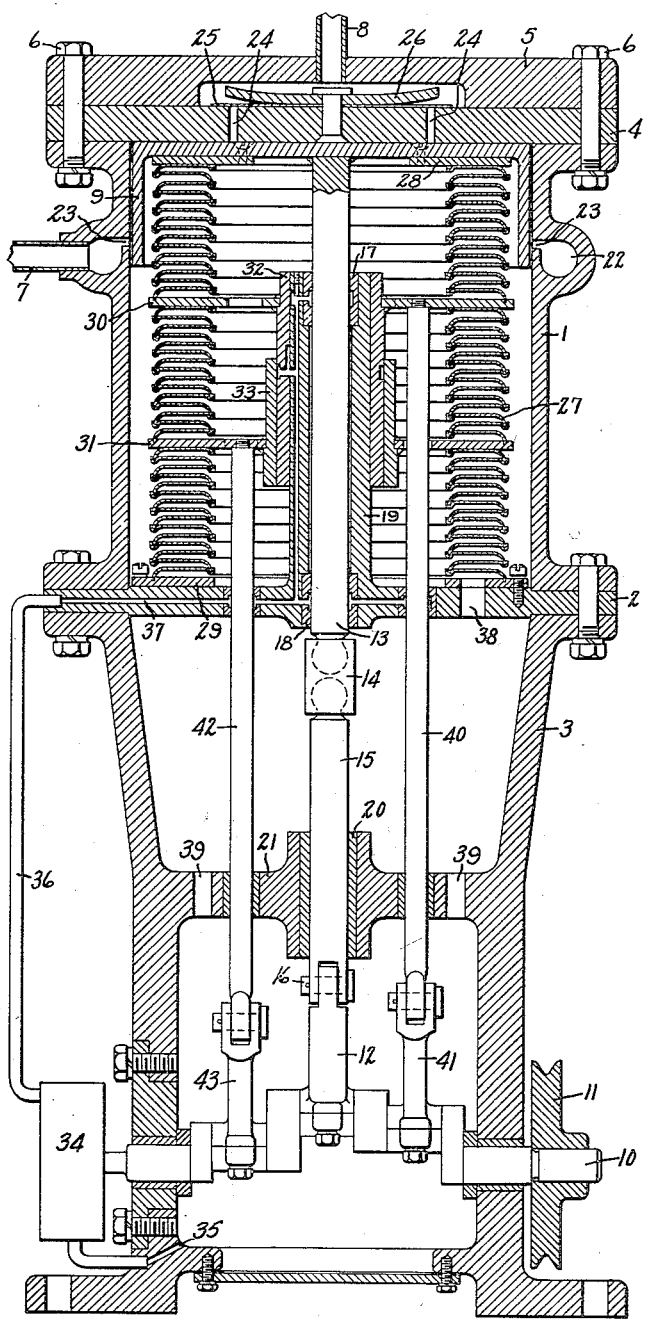
Inventor:
Lowell M. Kurtz.
by Harry E. Dunham
His Attorney

United States Patent Office 2,839,241
Patented June 17, 1958

2,839,241

SEALING DEVICE

Lowell M. Kurtz, Scotia, N. Y., assignor to General Electric Company, a corporation of New York Application January 16, 1945, Serial No. 573,062

8 Claims. (Cl. 230—172)

My invention relates to reciprocating mechanisms such as gas compressors and particularly to expansible bellows sealing devices for such mechanisms.

It is sometimes desirable to provide a gas compressor which is sealed against the leakage of oil or lubricant from the moving parts of the compressor into the gas passages thereof. Such compressors may be of the reciprocating type with the piston slightly smaller than the cylinder bore so that there is no contact between the bore and the piston during operation of the compressor, and lubrication of the cylinder walls is not necessary. A compressor of this type may be sealed by an expansible bellows of generally cylindrical form surrounding the piston rod and sealed to the piston and to the walls of the cylinder block. The length of stroke of such compressors is limited by the permissible expansion and contraction of the bellows and it is, therefore, desirable to provide a long bellows seal. Long seals, however, have resonant periods of vibration which may be of the same order as the speed of the compressor. Furthermore long bellows seals tend to expand and contract progressively from the driven end because of the inertia of the bellows. As a result the bellows are apt to break frequently and require shutdown of the apparatus for replacement of the seal. Accordingly it is an object of my invention to provide an improved sealing arrangement of the bellows type for reciprocating mechanisms.

It is another object of my invention to provide a reciprocating device including a longitudinally expansible bellows seal and an improved arrangement for insuring uniform expansion and contraction of the seal throughout its length during reciprocation of the device.

Further objects and advantages of my invention will become apparent as the following description proceeds and the features of novelty which characterize my invention will be pointed out with particularity in the claims annexed to and forming part of this specification.

For a better understanding of my invention, reference may be had to the accompanying drawing the single figure of which is a sectional elevation view of a gas compressor having a sealing arrangement embodying my invention.

Briefly, the compressor illustrated in the drawing comprises a cylinder and a reciprocating piston mounted therein and arranged to be driven from a suitable crankshaft through a reciprocable piston rod and connecting rod. A bellows seal surrounds the reciprocable piston rod. The bellows is divided into a plurality of sections by plates which are positively driven in synchronism with the piston but with strokes shorter than the piston stroke in proportion to the spacing of the sections from the end of the bellows. The sections are driven through reciprocating push rods and connecting rods on the same crankshaft as the piston. The several sections are thereby expanded and contracted uniformly.

Referring now to the drawing, the compressor comprises a cylinder 1 which, together with a supporting plate 2, is mounted on a supporting crankcase or housing structure 3. The upper end of the cylinder 1 is closed by a valve plate 4 clamped in position between the cylinder and cylinder head 5 by bolts 6. The cylinder is provided with an intake connection 7 and a discharge connection 8. Gas is drawn into the cylinder and discharged therefrom by operation of a reciprocable piston 9 having a diameter slightly less than the internal diameter of the cylinder so that it may be reciprocated without frictional engagement with the cylinder walls. In order to reciprocate the piston, a crankshaft 10 is mounted on the bearings of the crankcase and is driven from any suitable prime mover (not shown) through a suitable drive coupling such as a pulley 11. The shaft 10 is provided with a three bearing crank on the main or center bearing of which a connecting rod 12 is journaled, and the piston 9 is connected to be driven by the crank through a main push rod 13 connected through a ball and socket coupling 14 to a link 15 to which the connecting rod 12 is pivotally secured by a pin 16. The push rod 13 is mounted in upper and lower bearings 17 and 18 in a bearing post 19 which extends upwardly through the lower portion of the cylinder 1. The upper end of the post 19 determines the maximum stroke of the piston and the rod 13 and bearings 17 and 18 guide the piston during its operation. The link 15 is reciprocably mounted in a bearing 20 in a partition or cross support 21 of the crankcase 3.

During operation of the compressor, when the piston 9 is in its lowermost position, gas is drawn from an intake manifold 22 through ports 23 into the cylinder 1. On the return stroke the gas is compressed and forced out through discharge ports 24 closed by a spring valve 25 which is moved against a backing member 26. No lubrication is necessary for the piston, and in order to prevent lubricant necessary for the other parts of the compressor from entering the cylinder, an expansible bellows 27 is provided. The upper end of bellows 27 is secured to a ring 28 removably attached to the piston 9 and the lower end of the bellows is secured to a similar ring 29 which is removably attached to the supporting plate 2. The bellows 27 is divided into three sections separated by disks or spiders 30 and 31 which are arranged for reciprocation in synchronism with the piston 9. The disk 30 is mounted on a sleeve 32 about the post 19, and the disk 31 is mounted on a similar sleeve 33 about the sleeve 32.

An oil pump 34 is provided in order to lubricate the bearings of the compressor. The pump is driven by the shaft 10 and pumps oil from an inlet 35 at the bottom of the crankcase through a conduit 36 to a passage 37 in the plate 2. Oil is supplied from the passage 37 to passages in the bearing post 19 through which it reaches the bearings 17 and 18 and the bearing surfaces of the sleeves 32 and 33. The oil returns to the crankcase through openings 38 in the plate 2 and openings 39 in the partition 21. Oil circulated by the pump 34 is prevented from reaching the walls of the cylinder and the gas passages by the bellows 27.

Since the bellows 27 is long and has considerable mass, it tends to flex from its top end downwardly so that the upper sections of the bellows tend to move more than the lower sections thereof and the entire bellows tends to move nonuniformly during contraction and expansion. Furthermore a long bellows may have a natural period of vibration close to the period of reciprocation of the piston, in which case breakage may result due to resonance effects.

In order to secure uniform contraction and expansion of the bellows and to raise the effective frequency of vibration thereof, the spacing rings or plates 30 and 31 are driven in synchronism with the piston 9 but with shorter strokes proportioned to secure uniform movement of the entire bellows. The plate 30 is driven by a push rod 40 which is coupled to a connecting rod 41 driven by the right-hand bearing of the crank. The right-hand bearing provides a stroke two-thirds the length of the stroke of the piston. The plate 31 is driven through a rod 42 and a connecting rod 43 by the left-hand bearing of the crank; this bearing provides a stroke one-third the stroke of the piston. The lengths of the strokes of the positively driven supporting members 30 and 31 are proportioned in accordance with the spacing of these members from the lower support 2 as compared with the spacing of the piston 9 from the support; and, in the illustration, the spacings are equal so that the strokes of the upper and lower reciprocable supports 30 and 31 are respectively two-thirds and one-third the stroke of the piston. It will thus be evident that the average linear speeds of the piston and the supports 30 and 31 are progressively slower.

It will be evident that the three sections of the bellows 27 are driven positively by the piston and by the supports 30 and 31 so that each section is expanded and contracted at the same rate and uniformly. Furthermore each of the three sections has a natural period of vibration much higher than that which a single bellows would have if it extended from the piston to the support 2. Higher speeds are thus made possible without danger of breakage due to resonance effects, and furthermore the provision of a plurality of low inertia sections, each positively and uniformly driven, further facilitates the continued operation of the compressor without danger of breakage and the necessity of frequent servicing or repair.

While I have shown my invention as applied to a reciprocating gas compressor, other applications and embodiments will be apparent to those skilled in the art. I do not, therefore, desire my invention to be limited to the particular construction illustrated and described, and I intend by the appended claims to cover all modifications within the spirit and scope of my invention.

What I claim as new and desire to secure by Letters Patent of the United States is:

1. A reciprocating compressor comprising a stationary member having a cylinder therein, a piston in said cylinder, means for reciprocating said piston to compress gas upon movement toward one end of said cylinder, a longitudinally expansible cylindrical bellows having one end sealed to said piston and its other end sealed to said stationary member near the other end of said cylinder for providing a fluid-tight seal between said piston and the wall of said cylinder, said bellows being alternately expanded and contracted by the reciprocation of said piston, reciprocable supporting means for dividing said bellows into a plurality of sections whereby the resonant frequency of vibration of each of said sections is substantially higher than the rate of reciprocation of said piston, and means for reciprocating said supporting means in synchronism with said piston and with strokes proportioned in accordance with the spacing of said sections to provide uniform contraction and expansion of said bellows and thereby minimize danger of breakage of said bellows.

2. A reciprocating compressor comprising a stationary member having a cylinder therein, a piston in said cylinder, means for reciprocating said piston to compress gas upon movement toward one end of said cylinder, a longitudinally expansible cylindrical bellows having one end sealed to said piston and its other end sealed to said stationary member near the other end of said cylinder for providing a fluid-tight seal between said piston and the wall of said cylinder, said bellows being alternately expanded and contracted by the reciprocation of said piston, and means for positively driving at least one intermediate section of said bellows in synchronism with said piston and with a stroke bearing the same ratio to the stroke of said piston as the distance between said section and said other end of the cylinder bears to the corresponding distance between said piston and said other end of the cylinder to minimize danger of breakage of said bellows.

3. A reciprocating compressor comprising a stationary member having a cylinder therein, a piston in said cylinder, means for reciprocating said piston to compress gas upon movement toward one end of said cylinder, a longitudinally expansible cylindrical bellows having one end sealed to said piston and its other end sealed to said stationary member near the other end of said cylinder for providing a fluid-tight seal between said piston and the wall of said cylinder, said bellows being alternately expanded and contracted by the reciprocation of said piston, and means for positively driving an intermediate section of said bellows in synchronism with said piston and at an average linear speed substantially equal to the average linear speed of said piston multiplied by the ratio of the spacing of said section from said other end of said cylinder to the spacing of said piston from said other end of said cylinder to minimize danger of breakage of said bellows.

4. A reciprocating compressor comprising a stationary member having a cylinder therein, a piston in said cylinder, means for reciprocating said piston to compress gas upon movement toward one end of said cylinder, a longitudinally expansible cylindrical bellows having one end sealed to said piston and its other end sealed to said stationary member near the other end of said cylinder for providing a fluid-tight seal between said piston and the wall of said cylinder, said bellows being alternately expanded and contracted by the reciprocation of said piston, and means for positively reciprocating a plurality of spaced sections of said bellows in synchronism with said piston, the strokes of said piston and of said sections being progressively shorter from said piston toward said other end of said cylinder, whereby said bellows is expanded and contracted substantially uniformly throughout its length and danger of breakage thereof is minimized.

5. A reciprocating compressor comprising a stationary member having a cylinder therein, a piston in said cylinder, means for reciprocating said piston to compress gas upon movement toward one end of said cylinder, a longitudinally expansible cylindrical bellows having one end sealed to said piston and its other end sealed to said stationary member near the other end of said cylinder for providing a fluid-tight seal between said piston and the wall of said cylinder, said bellows being alternately expanded and contracted by the reciprocation of said piston, said bellows including two sections, a reciprocable supporting element mounted on said stationary member near the adjacent ends of said two sections and having an annular portion secured to said sections for sealing said sections together, and means for positively reciprocating said element in synchronism with said piston the strokes of said piston and said element being proportional to their respective distances from said other end of said cylinder whereby said bellows is expanded and contracted substantially uniformly and danger of breakage thereof is minimized.

6. A reciprocating compressor comprising a stationary member having a cylinder therein, a piston in said cylinder, means for reciprocating said piston to compress gas upon movement toward one end of said cylinder, a longitudinally expansible cylindrical bellows having one end sealed to said piston and its other end sealed to said stationary member near the other end of said cylinder for providing a fluid-tight seal between said piston and the wall of said cylinder, said bellows being alternately expanded and contracted by the reciprocation of said piston, a plurality of spaced reciprocable supporting rings arranged at intervals along said bellows and secured to said bellows, and means for positively reciprocating said rings in synchronism with said piston and with strokes decreasing progressively from said piston toward said support in proportion to the respective distances from said support whereby said bellows is expanded and contracted substantially uniformly and danger of breakage thereof is minimized.

7. A reciprocating compressor comprising a stationary member having a cylinder therein, a piston in said cylinder, a bearing post extending from said member toward said piston for supporting said piston, means including a rod extending through said piston for reciprocating said piston to compress gas upon movement toward one end of said cylinder, a longitudinally expansible cylindrical bellows spaced from and surrounding said post and having one end sealed to said piston and its other end sealed to said stationary member near the other end of said cylinder for providing a fluid-tight seal between said piston and the wall of said cylinder, said bellows being alternately expanded and contracted by the reciprocation of said piston, a sleeve mounted for reciprocation on said post and having an annular portion rigidly secured to said bellows intermediate the ends thereof, and means for reciprocating said sleeve in synchronism with said piston the strokes of said piston and said sleeve being proportional to the respective distances from said support to said piston and sleeve whereby said bellows is expanded and contracted substantially uniformly and danger of breakage thereof is minimized.

8. A reciprocating compressor comprising a stationary member having a cylinder therein, a piston in said cylinder, means for reciprocating said piston to compress gas upon movement toward one end of said cylinder, a longitudinally expansible cylindrical bellows having one end sealed to said piston and its other end sealed to said stationary member near the other end of said cylinder for providing a fluid-tight seal between said piston and the wall of said cylinder, said bellows being alternately expanded and contracted by the reciprocation of said piston, means including a plurality of reciprocable plates for dividing said bellows into a plurality of sections each of said plates being secured to said bellows between two of said sections, and means for positively reciprocating said plates in synchronism with said piston the strokes of said plates being progressively less than the stroke of said piston in proportion to the respective distances from said piston and from each of said plates to said other end of said cylinder whereby said bellows is expanded and contracted substantially uniformly and danger of breakage thereof is minimized.

References Cited in the file of this patent

UNITED STATES PATENTS

| | | |
|---|---|---|
| 1,527,545 | Emmerling | Feb. 24, 1925 |
| 1,787,700 | Persons | Jan. 6, 1931 |
| 2,137,303 | Nelson | Nov. 22, 1938 |